United States Patent
Kim et al.

(10) Patent No.: US 9,966,594 B2
(45) Date of Patent: May 8, 2018

(54) NEGATIVE ACTIVE MATERIAL, METHOD OF PREPARING THE SAME, AND LITHIUM BATTERY INCLUDING NEGATIVE ACTIVE MATERIAL

(75) Inventors: Beom-Kwon Kim, Yongin-si (KR); Jae-Myung Kim, Yongin-si (KR); So-Ra Lee, Yongin-si (KR); Chang-Su Shin, Yongin-si (KR); Ui-Song Do, Yongin-si (KR)

(73) Assignee: Samsung SDI Co., Ltd., Giheung-go, Yongin-si, Gyeonggi-do (KR)

( * ) Notice: Subject to any disclaimer, the term of this patent is extended or adjusted under 35 U.S.C. 154(b) by 910 days.

(21) Appl. No.: 13/464,404

(22) Filed: May 4, 2012

(65) Prior Publication Data
US 2013/0004846 A1 Jan. 3, 2013

(30) Foreign Application Priority Data

Jun. 30, 2011 (KR) .................... 10-2011-0065133

(51) Int. Cl.
| | |
|---|---|
| *H01M 4/583* | (2010.01) |
| *H01M 4/13* | (2010.01) |
| *H01M 4/38* | (2006.01) |
| *H01M 4/60* | (2006.01) |
| *H01M 4/133* | (2010.01) |

(Continued)

(52) U.S. Cl.
CPC ............ *H01M 4/133* (2013.01); *B82Y 30/00* (2013.01); *H01M 4/134* (2013.01); *H01M 4/1393* (2013.01); *H01M 4/1395* (2013.01); *H01M 4/364* (2013.01); *H01M 4/366* (2013.01);

(Continued)

(58) Field of Classification Search
CPC ....... H01M 4/133; H01M 4/134; H01M 4/366
See application file for complete search history.

(56) References Cited

U.S. PATENT DOCUMENTS

| | | |
|---|---|---|
| 4,357,368 A | 11/1982 | Longsderff et al. |
| 6,413,672 B1 | 7/2002 | Suzuki et al. |

(Continued)

FOREIGN PATENT DOCUMENTS

| | | |
|---|---|---|
| JP | 2006196234 | 7/2006 |
| JP | 2007005201 | 1/2007 |

(Continued)

OTHER PUBLICATIONS

Korean Notice of Allowance dated Nov. 29, 2013 in connection with Korean Patent Application No. 10-2011-065133 and Request for Entry of the Accompanying Office Action attached herewith.

(Continued)

*Primary Examiner* — Stephan Essex
(74) *Attorney, Agent, or Firm* — Robert E. Bushnell, Esq.

(57) ABSTRACT

A negative active material, a method of preparing the same, and a lithium battery including the negative active material are disclosed. The negative active material includes a silicon-based nanocore and a first amorphous carbonaceous coating layer that is formed of carbonized organic material and that is uniformly and continuously formed on a surface of the silicon-based nanocore, whereby irreversible capacity losses due to volumetric expansion/contraction caused when a lithium battery is charged and discharged are compensated and cycle lifetime characteristics are enhanced.

19 Claims, 8 Drawing Sheets

(51) Int. Cl.
*B82Y 30/00* (2011.01)
*H01M 4/134* (2010.01)
*H01M 4/1393* (2010.01)
*H01M 4/1395* (2010.01)
*H01M 4/36* (2006.01)
*H01M 4/02* (2006.01)
*B82Y 40/00* (2011.01)

(52) U.S. Cl.
CPC ........ *B82Y 40/00* (2013.01); *H01M 2004/021* (2013.01); *H01M 2004/027* (2013.01)

(56) References Cited

U.S. PATENT DOCUMENTS

| | | | |
|---|---|---|---|
| 2002/0164479 A1* | 11/2002 | Matsubara | H01M 4/362 428/367 |
| 2005/0233213 A1* | 10/2005 | Lee et al. | 429/218.1 |
| 2006/0234127 A1* | 10/2006 | Kim et al. | 429/232 |
| 2007/0048607 A1* | 3/2007 | Nakashima et al. | 429/209 |
| 2007/0122712 A1* | 5/2007 | Kang et al. | 429/232 |
| 2009/0010831 A1 | 1/2009 | Jeong et al. | |
| 2009/0162750 A1* | 6/2009 | Kawakami et al. | 429/218.1 |
| 2010/0143798 A1* | 6/2010 | Zhamu | H01M 4/133 429/212 |
| 2010/0273058 A1 | 10/2010 | Lee et al. | |
| 2011/0165464 A1 | 7/2011 | Yew et al. | |
| 2011/0165467 A1 | 7/2011 | Yew et al. | |

FOREIGN PATENT DOCUMENTS

| | | |
|---|---|---|
| KR | 1020010081928 | 8/2001 |
| KR | 1020050090218 A | 9/2005 |
| KR | 1020070113066 | 11/2007 |
| KR | 1020090058505 | 6/2009 |
| KR | 1020110080366 A | 7/2011 |

OTHER PUBLICATIONS

Korean Office Action dated Mar. 28, 2013 in the corresponding Korean Patent Application No. 10-2011-0065133.

Yoon Seok Jung et al, Si-carbon core-shell composite anode in lithium secondary batteries, Electrochimica Acta 52 (2007) 7061-7067, on the web May 21, 2007.

Liwei Su, Core double-shell Si@SiO2@C nanocomposites as anode materialsfor Li-ion batteries, Chem. Commun 46 (2010) 2590-2592, on the web Feb. 5, 2010.

* cited by examiner

A NEGATIVE ACTIVE MATERIAL, METHOD OF PREPARING THE SAME, AND LITHIUM BATTERY INCLUDING NEGATIVE ACTIVE MATERIAL

CLAIM OF PRIORITY

This application claims the benefit of Korean Patent Application No. 10-2011-0065133, filed on 30 Jun. 2011 in the Korean Intellectual Property Office, the disclosure of which is incorporated herein in its entirety by reference.

BACKGROUND OF THE INVENTION

Field of the Invention

One or more embodiments of the present invention relate to a negative active material, a method of preparing the same, and a lithium battery including the negative active material.

Description of the Related Art

Lithium secondary batteries used in portable electronic devices for information communication, such as PDAs, mobile phones, notebook computers, and the like, electric bicycles, and electric vehicles exhibit a discharge voltage that is twice or more than that of general batteries, and thus may have a high energy density.

Lithium secondary batteries include a positive electrode and a negative electrode that include an active material that allows intercalation and deintercalation of lithium ions, and an organic electrolyte or a polymer electrolyte interposed therebetween. Such lithium secondary batteries generate electric energy according to an oxidation/reduction reaction occurring when lithium ions are intercalated/deintercalated in the positive and negative electrodes.

Positive active materials of lithium secondary batteries may be oxides of lithium and a transition metal that allow intercalation of lithium ions, such as a lithium cobalt oxide ($LiCoO_2$), a lithium nickel oxide ($LiNiO_2$), and a lithium nickel cobalt manganese oxide (e.g., $Li[NiCoMn]O_2$, $Li[Ni_{1-x-y}Co_xM_y]O_2$).

Research into negative active materials that allow intercalation and deintercalation of lithium ions, such as various types of carbonaceous materials including artificial and natural graphite and hard carbon and non-carbonaceous materials such as Si, has been conducted.

Such non-carbonaceous materials exhibit a very high capacity density at least ten times that of graphite. However, due to volumetric expansion and contraction of a non-carbonaceous material during charging and discharging of a lithium battery, the lithium battery may have a low capacity retention ratio, a low charge/discharge efficiency, and a decreased lifetime. Therefore, there is a need to develop a high-performance negative active material with enhanced capacity and cycle lifetime characteristics.

SUMMARY OF THE INVENTION

One or more embodiments of the present invention include a negative active material with an enhanced cycle lifetime.

One or more embodiments of the present invention include a method of preparing the negative active material.

One or more embodiments of the present invention include a lithium battery including the negative active material.

Additional aspects will be set forth in part in the description which follows and, in part, will be apparent from the description, or may be learned by practice of the presented embodiments.

According to one or more embodiments of the present invention, a negative active material includes a secondary particle in which primary nanoparticles agglomerate with each other, wherein the primary nanoparticles each include a silicon-based nanocore; and a first amorphous carbonaceous coating layer that is continuously formed on a surface of the silicon-based nanocore.

According to one or more embodiments of the present invention, a negative active material may be prepared by pulverizing a mixture of silicon-based particles and an organic material in an organic solvent via a milling process and drying the pulverized mixture; and spherizing the dried mixture and heat treating the spherized product to carbonize the organic material.

According to one or more embodiments of the present invention, a lithium battery includes a negative electrode including the negative active material described above.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF THE INVENTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

According to an embodiment of the present invention, a negative active material includes a secondary particle including primary nanoparticles that agglomerate with each other. The primary nanoparticles each include a silicon-based nanocore and a first amorphous carbonaceous coating layer that is continuously formed on a surface of the silicon-based nanocore.

Figure 1:
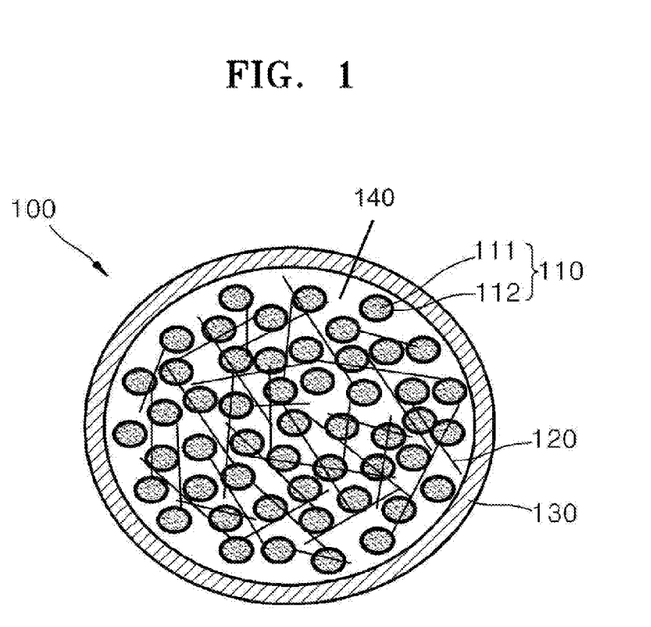
FIG. 1 is a cross-sectional view of a negative active material according to an embodiment of the present invention.

FIG. 1 is a cross-sectional view of a negative active material according to an embodiment of the present invention. Referring to FIG. 1, the negative active material includes a secondary particle 100 in which a plurality of primary nanoparticles 110 are agglomerated with each other, and the primary nanoparticles 110 each include a silicon-based nanocore 111 and a first amorphous carbonaceous coating layer 112 that is continuously and uniformly formed on a surface of the silicon-based nanocore 111.

The primary nanoparticles 110 may have an average diameter on the scale of nanometers, for example, 300 nm or less. In particular, the average diameter of the primary nanoparticles 110 may be in a range of about 100 to about 300 nm, for example, in a range of about 200 to about 250 nm. The primary nanoparticles 110 having an average diameter within the range described above may easily agglomerate with each other through a spherizing process to form the secondary particle 100. Spherizing is a technique in which a material of irregular shape is formed into spherically shaped particles.

The silicon-based nanocore 111 of the primary nanoparticles 110 may include Si, $SiO_x$ where $0<x\leq2$, or a Si-Z alloy wherein Z is an alkali metal, an alkali earth metal, a Group XIII element, a Group XIV element, a transition metal, a rare earth element, or a combination thereof; however, Z is not Si. Z may be at least one selected from the group consisting of Mg, Ca, Sr, Ba, Ra, Sc, Y, La, Ti, Zr, Hf, V, Nb, Ta, Cr, Mo, W, Tc, Re, Fe, Ru, Os, Co, Rh, Ir, Ni, Pd, Pt, Cu, Ag, Au, Zn, Cd, B, Ge, P, As, Sb, Bi, S, Se, Te, and Po. Such silicon-based materials may be readily formed into nanoparticles via a milling process such as a bead mill process or a ball mill process.

The first amorphous carbonaceous coating layer 112 is uniformly and continuously formed on the surface of the silicon-based nanocore 111. The first amorphous carbonaceous coating layer 112 prevents a crystalline structure of the silicon-based material described above, for example, Si, $SiO_x$, or an Si—Z alloy, from being converted to an amorphous structure due to nanoparticles surface oxidization and increases electrical conductivity of the negative active material.

The first amorphous carbonaceous coating layer 112 may be formed of a carbide of an organic material selected from the group consisting of sucrose, glucose, galactose, fructose, lactose, mannose, ribose, aldohexose, ketohexose, and combinations thereof.

Such organic materials may be dissolved in an organic solvent such as alcohol. For example, the silicon-based material is pulverized in an organic solvent together with the organic material by a ball mill process and the resultant is then dried, thereby obtaining silicon-based nanoparticles with the organic material uniformly distributed on surfaces of the nanoparticles. Subsequently, the resultant is spherized and heat treated to carbonize the organic material, thereby completing formation of the first amorphous carbonaceous coating layer 112 continuously formed on the surface of the silicon-based nanocore 111.

The first amorphous carbonaceous coating layer 112 forms a conductive path in the negative active material, thereby increasing the electrical conductivity of the negative active material. Thus, a conductive material is not needed to prepare the negative active material including the first amorphous carbonaceous coating layer 112, or an amount of conductive material used may be minimized. Accordingly, a capacity per unit volume of the negative active material is increased and thus the negative active material may exhibit a high capacity. The primary nanoparticles 110 including the silicon-based nanocore 111 and the first amorphous carbonaceous coating layer 112 continuously formed on the surface of the silicon-based nanocore 111 may have a capacity per unit volume in a range of about 1500 to about 2500 mAh/cc.

The amount of the first amorphous carbonaceous coating layer 112 may be in a range of about 1 to about 10 parts by weight based on 100 parts by weight of the silicon-based nanocore 111. In particular, the amount of the first amorphous carbonaceous coating layer 112 may be in a range of about 2 to about 8parts by weight, for example, in a range of about 4 to about 6 parts by weight, based on 100 parts by weight of the silicon-based nanocore 111. When the amount of the first amorphous carbonaceous coating layer 112 is within this range, a conductive path between the silicon-based nanocores 111 with relatively low electrical resistivity is maintained, and thus a lithium battery including the negative active material may have increased electrical conductivity.

The first amorphous carbonaceous coating layer 112 may have any thickness as long as it provides a sufficient conductive path and does not reduce a capacity of the lithium battery. For example, the thickness of the first amorphous carbonaceous coating layer 112 may be in a range of about 1 to about 100 nm, for example, in a range of about 10 to about 100 nm, but is not limited thereto.

The secondary particle 100 may further include a crystalline carbonaceous material 120. When the negative active material is prepared by mixing the crystalline carbonaceous material 120 with the primary nanoparticles 110 composed of, as a main constituent, the silicon-based material, the negative active material may have enhanced capacity and cycle characteristics.

The crystalline carbonaceous material 120 is in a crystalline flake structure. The term "flake structure" used herein is interpreted to include a two-dimensional form as a basic structure, with various modifications such as bending, rolling, partial defect, or the like.

For example, the crystalline carbonaceous material 120 may be one selected from the group consisting of a polycyclic nano-sheet in which rings of carbon atoms fused to one another are arranged on a plane, a lamination of polycyclic nano-sheets, graphite, and combinations thereof. For example, the polycyclic nano-sheet may be graphene. The lamination of polycyclic nano-sheets may be, for example, a lamination of 2 to 50 polycyclic nano-sheets. Also, a lamination of polycyclic nano-sheets that is partially expanded may be used as the crystalline carbonaceous material 120.

The amount of the crystalline carbonaceous material 120 may be in a range of about 75 to about 95 parts by weight based on 100 parts by weight of the primary nanoparticles 110.

The secondary particle 100 may further include a second amorphous carbonaceous coating layer 130 on its surface and a pore 140 within. The second amorphous carbonaceous coating layer 130 may include a material selected from the group consisting of soft carbon (carbon sintered at low temperatures), hard carbon, a pitch carbide, a meso-phase pitch carbide, sintered coke, arid combinations thereof.

For example, the second amorphous carbonaceous coating layer 130 may be simultaneously formed with the formation of the first amorphous carbonaceous coating layer 112 by spherizing silicon-based nanoparticles obtained by mechanically pulverizing a silicon-based material with an organic material, by coating surfaces of the spherized silicon-based nanoparticles with a carbon precursor selected from the group consisting of coal-based pitch, a meso-phase pitch, a petroleum-based pitch, a coal-based oil, a petroleum-based heavy oil, an organically synthesized pitch, and a polymer resin such as a phenol resin, a furan resin, or a polyimide resin, and by heat treating the resultant in an inert atmosphere such as an argon or nitrogen atmosphere to carbonize the organic material. Alternatively, the second amorphous carbonaceous coating layer 130 may be formed by coating a surface of a previously prepared second particle 100 with the carbon precursor and heat treating the resultant second particle 100.

The secondary particles 100 may have an average diameter of at most 50 μm. When the average diameter of the secondary particle 100 is greater than 50 μm, degradation of characteristics due to an increase in charge/discharge rates may occur. In particular, the average diameter of the secondary particle 100 may be in a range of about 5 to about 30 μm, for example, in a range of about 10 to about 20 μm.

According to another embodiment of the present invention, a method of preparing the negative active material includes pulverizing a mixture of silicon-based particles and an organic material in an organic solvent via a milling process and drying the resultant mixture; and spherizing the resultant mixture and heat treating the resultant product to carbonize the organic material.

The silicon-based particles are a raw material for forming the silicon-based nanocore 111. Examples of the silicon-based particles may include Si, $SiO_x$ where $0<x\leq2$, a Si—Z alloy wherein Z is an alkali metal, an alkali earth metal, a Group XIII element, a Group XIV element, a transition metal, a rare earth element, or a combination thereof; however, Z is not Si. In this regard, Z may be selected from the group consisting of manganese (Mn), calcium (Ca), strontium (Sr), barium (Ba), radium (Ra), scandium (Sc), yttrium (Y), lanthanum (La), titanium (Ti), zirconium (Zr), hafnium (Hf), vanadium (V), niobium (Nb), tantalum (Ta), chromium (Cr), molybdenum (Mo), tungsten (W), technetium (Tc), rhenium (Re), iron (Fe), ruthenium (Ru), osmium (Os), cobalt (Co), rhodium (Rh), iridium (Ir), nickel (Ni), palladium (Pd), platinum (Pt), copper (Cu), silver (Ag), gold (Au), zinc (Zn), cadmium (Cd), boron (B), germanium (Ge), phosphorus (P), arsenic (As), antimony (Sb), bismuth (Bi), sulfur (S), selenium (Se), tellurium (Te), polonium (Po), and combinations thereof.

The organic material may be selected from the group consisting of sucrose, glucose, galactose, fructose, lactose, starch, mannose, ribose, aldohexose, ketohexose, and combinations thereof. The amount of the organic material may be in a range of about 1 to about 30 parts by weight based on 100 parts by weight of the silicon-based particles, considering the thickness of a coating layer that is desired, and the degree of improvement in electrical conductivity that is desired.

The organic solvent may be an alcohol such as ethanol, n-butanol, 1-propanol, or 2-propanol. The amount of the organic solvent may be in a range of about 100 to about 300 parts by weight based on 100 parts by weight of the silicon-based particles.

The organic material may be uniformly dispersed in the organic solvent. For example, if the siliconbased particles are pulverized together with the organic material in the organic solvent via a milling process, the organic material, as well as the silicon-based particles, is pulverized into nanoparticles, and thus the silicon-based particles and the organic material may be uniformly mixed. In this regard, a hydroxyl group (—OH) on surfaces of the silicon-based particles reacts with a hydroxyl group (—OH) of the organic material to form $H_2O$ as a byproduct, and the organic material is uniformly combined to the surfaces of the nano-sized silicon-based particles. The degree of the reaction may vary depending on milling energy and time. Subsequently, the pulverized product in which the organic material is uniformly dispersed on the surfaces of the nano-sized silicon-based particles is dried, the organic solvent and the water byproduct are removed therefrom, and the resultant product is heat treated to carbonize the organic material. As a result, the first amorphous carbonaceous coating layer uniformly and continuously formed on the silicon-based nanocore may be obtained.

The milling process may be performed using a bead mill, a high energy ball mill, a planetary mill, a stirred ball mill, or a vibration mill. The bead mill and the ball mill may be composed of a chemically inert substance that does not react with the silicon-based particles and the organic material, for example, zirconia. The size of the bead mill or the ball mill may be in a range of about 0.1 to about 1 mm, but is not limited thereto.

The milling process may be performed for an appropriate amount of time considering the size of used silicon-based particles, the desired size of finally obtained particles, and the size of a bead mill or ball mill used in the milling process, for example, for about 0.5 to about 10 hours.

The pulverized product obtained via the milling process is dried to evaporate the organic solvent. The drying process may be performed at a temperature within a range that allows evaporation or volatilization of the organic solvent, for example, in a range of about 60 to about 150° C.

The resulting mixture obtained via pulverization via the milling process and the drying process may be in a form where the organic material pulverized into nanoparticles is uniformly dispersed on the surfaces of the silicon-based particles pulverized into nanoparticles and between the silicon-based particles.

Next, the resulting mixture is spherized and heat treated to carbonize the organic material. In other words, the organic material uniformly dispersed on the surfaces of the nano-sized silicon-based particles is carbonized to form a uniform, continuous amorphous carbonaceous coating layer on the surfaces of the nano-sized silicon-based particles, To increase the conductivity of the negative active material, in the spherizing process, a crystalline carbonaceous material may be further added to the mixture. The crystalline carbonaceous material is of a crystalline flake structure. The crystalline carbonaceous material may be selected from the group consisting of a polycyclic nano-sheet in which rings of carbon atoms fused to one another are arranged on a plane, a lamination of polycyclic nano-sheets, graphite, and combinations thereof. For example, the polycyclic nano-sheet may be graphene. The lamination of polycyclic nano-sheets may be, for example, a lamination of 2 to 50 polycyclic nano-sheets. Also, a lamination of polycyclic nano-sheets that is partially expanded may be used as the crystalline carbonaceous material. The amount of the crystalline carbonaceous material may be in a range of about 50 to about 95 parts by weight based on 100 parts by weight of the mixture of the silicon-based particles and the organic material.

Prior to the heat treatment process, the method of preparing the negative active material may further include coating a surface of the spherized mixture with a carbon precursor selected from the group consisting of a coal-based pitch, a meso-phase pitch, a petroleum-based pitch, a coal-based oil, a petroleum-based heavy oil, an organically synthesized pitch, and a polymer resin such as a phenol resin, a furan resin, or a polyimide resin.

Through the heat treatment process, the organic material is carbonized, and as a result, an amorphous carbonaceous coating layer that provides a conductive path in the negative active material may be formed. The heat treatment process may be performed at a temperature in a range of about 700 to about 1000° C. In addition, the heat treatment process may be performed in a reducing atmosphere such as an argon or nitrogen atmosphere since the organic material is capable of absorbing oxygen existing between the silicon-based particles.

As described above, the amorphous carbonaceous coating layer may be continuously formed on the surface of the silicon-based nanocore by using the preparation method of the negative active material. Therefore, the negative active material with high capacity and cycle characteristics may be obtained.

According to another embodiment of the present invention, a lithium battery includes a negative electrode including the negative active material described above, a positive electrode including a positive active material and facing the negative electrode, and an electrolyte interposed between the negative electrode and the positive electrode.

The negative electrode includes the negative active material described above and may be prepared by adding the negative active material described above, a binder, and a conductive material (selectively used) to a solvent and mixing the solution to prepare a negative active material composition, and then forming the negative active material composition into a certain shape, or coating a current collector such as a copper foil with the negative active material composition.

The binder included in the negative active material composition is a component assisting in binding the negative active material and the conductive material to each other, and in binding the negative active material and the current collector to each other, and the amount of the binder may be in a range of about 1 to about 50 parts by weight based on 100 parts by weight of the negative active material. Examples of the binder include polyvinylidene fluoride, polyvinyl alcohols, carboxymethylcellulose (CMC), starch, hydroxypropylcellulose, regenerated cellulose, polyvinylpyrrolidone, tetrafluoroethylene, polyethylene, polypropylene, ethylene-propylenediene terpolymer (EPDM), sulfonated EPDM, styrene butadiene rubber, fluoro rubber, and various copolymers.

The conductive material is not necessarily used in preparation of the negative active material because the negative active material described above provides a conductive path, or the conductive material may be selectively used to increase the electrical conductivity of the negative active material. The conductive material may be any material used in general lithium batteries. Examples of the conductive material include carbonaceous materials such as natural graphite, artificial graphite, carbon blacks, acetylene black, Ketjen black, and carbon fibers; metallic powders such as copper powder, nickel powder, aluminum powder, and silver powder; conductive polymers such as polyphenylene derivatives; and mixtures thereof. The amount of the conductive material may be appropriately adjusted.

Examples of the solvent include N-methylpyrrolidone (NMP), acetone, water, and the like. The amount of the solvent may be in a range of about 1 to about 10 parts by weight based on 100 parts by weight of the negative active material. When the amount of the solvent is within this range, a process of forming a negative active material layer is easily performed.

In addition, the current collector is generally fabricated to have a thickness in a range of about 3 to about 500 μm. The current collector is not particularly limited, and may be any material as long as it has suitable conductivity and does not cause chemical changes in the fabricated battery. Examples of the current collector include copper, stainless steel, aluminum, nickel, titanium, sintered carbon, copper or stainless steel that is surface-treated with carbon, nickel, titanium or silver, and aluminum-cadmium alloys. In addition, the current collector may be processed to have fine irregularities on surfaces thereof so as to enhance adhesive strength of the current collector to the negative active material, and may be used in any of various forms including films, sheets, foils, nets, porous structures, foams, and non-woven fabrics.

The negative active material composition may be directly coated on the current collector to manufacture a negative electrode plate. Alternatively, the negative electrode plate may be manufactured by casting the negative active material composition on a separate support to form a negative active material film, separating the negative active material film from the support, and laminating the negative active material film on a copper foil current collector. The negative electrode is not limited to the examples described above, and may be in other forms.

Alternatively, the negative active material composition may be printed on a flexible electrode substrate to manufacture a printable battery.

Separately, to fabricate the positive electrode, a positive active material, a conductive material, a binder, and a solvent are mixed together to prepare a positive active material composition.

Any lithium-containing metal oxide that is commonly used in the art may be used as the positive active material. Examples of the lithium-containing metal oxide include $LiCoO_2$, $LiMn_xO_{2x}$ where x=1 or 2, $LiNi_{1-x}Mn_xO_2$ where $0<x\leq1$, and $LiNi_{1-x-y}Co_xMn_yO_2$ where $0\leq x\leq0.5$ and $0\leq y\leq0.5$. For example, compounds that allow intercalation and deintercalation of lithium ions, such as $LiMn_2O_4$, $LiCoO_2$, $LiNiO_2$, $LiFeO_2$, $V_2O_5$, TiS, MoS, and the like may be used.

The conductive material, the binder, and the solvent used in the negative active material composition described above may also be used in the positive active material composition. If required, a plasticizer may be added to each of the positive material composition and the negative material composition to form pores inside electrode plates thereof. In this regard, the amounts of the positive active material, the conductive material, the binder, and the solvent may be the same as those used in a general lithium battery.

A positive electrode current collector is fabricated to have a thickness in a range of about 3 to about 500 μm, and may be any current collector as long as it has high conductivity and does not cause chemical changes in the fabricated battery. Examples of the positive electrode current collector include stainless steel, aluminum, nickel, titanium, sintered carbon, and aluminum or stainless steel that is surface-treated with carbon, nickel, titanium, or silver. The positive electrode current collector is processed to form fine irregularities on surfaces thereof so as to enhance adhesive strength of the current collector to the positive active material, and may be used in any of various forms including films, sheets, foils, nets, porous structures, foams, and non-woven fabrics.

The positive active material composition is directly coated on the positive electrode current collector and dried to prepare a positive electrode plate. Alternatively, the positive active material composition may be cast on a separate support to form a positive active material film, and then the positive active material film may be separated from the support and laminated on the positive electrode current collector to prepare the positive electrode plate.

The positive electrode and the negative electrode may be separated from each other by a separator. Any separator that is commonly used in lithium batteries may be used. In particular, the separator may have a low resistance to migration of ions in an electrolyte and have a high electrolyte-retaining ability. Examples of the separator may include glass fiber, polyester, Teflon, polyethylene, polypropylene, polytetrafluoroethylene (PTFE), and combinations thereof, each of which may be a nonwoven fabric or a woven fabric. The separator has a pore diameter in a range of about 0.01 to about 10 μm and a thickness in a range of about 5 to about 300 μm.

A lithium salt-containing non-aqueous electrolyte is composed of a non-aqueous electrolytic solution and lithium. As the non-aqueous electrolyte, a non-aqueous electrolytic solution, an organic solid electrolyte, or an inorganic solid electrolyte may be used.

As the non-aqueous electrolytic solution, any of aprotic organic solvents such as N-methyl-2-pyrrolidone, propylene carbonate, ethylene carbonate, butylene carbonate, dimethyl carbonate, diethyl carbonate, gamma-butyro lactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate may be used.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, $LiI$, $Li_5NI_2$, $Li_3N-LiI-LiOH$, $LiSiO_4$, $LiSiO_4-LiI-LiOH$, $Li_2SiS_3$, $Li_4SiO_4$, $Li_4SiO_4-LiI-LiOH$, and $Li_3PO_4-Li_2S-SiS_2$.

The lithium salt may be any lithium salt that is commonly used in a lithium battery, and that is soluble in the above-described lithium salt-containing non-aqueous electrolyte. For example, the lithium salt includes at least one selected from the group consisting of $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic carboxylic acid lithium, lithium tetraphenyl borate, and imide.

Lithium batteries may be classified into lithium ion batteries, lithium ion polymer batteries, and lithium polymer batteries according to types of a separator and electrolyte used therein. In addition, lithium batteries may be classified into a cylindrical type, a rectangular type, a coin type, and a pouch type according to battery shape, and may also be classified into a bulk type and a thin film type according to battery size. Lithium batteries may be used either as primary lithium batteries or secondary lithium batteries.

A method of manufacturing a lithium battery is widely known in the art, and a detailed description thereof will not be provided herein.

Figure 2:
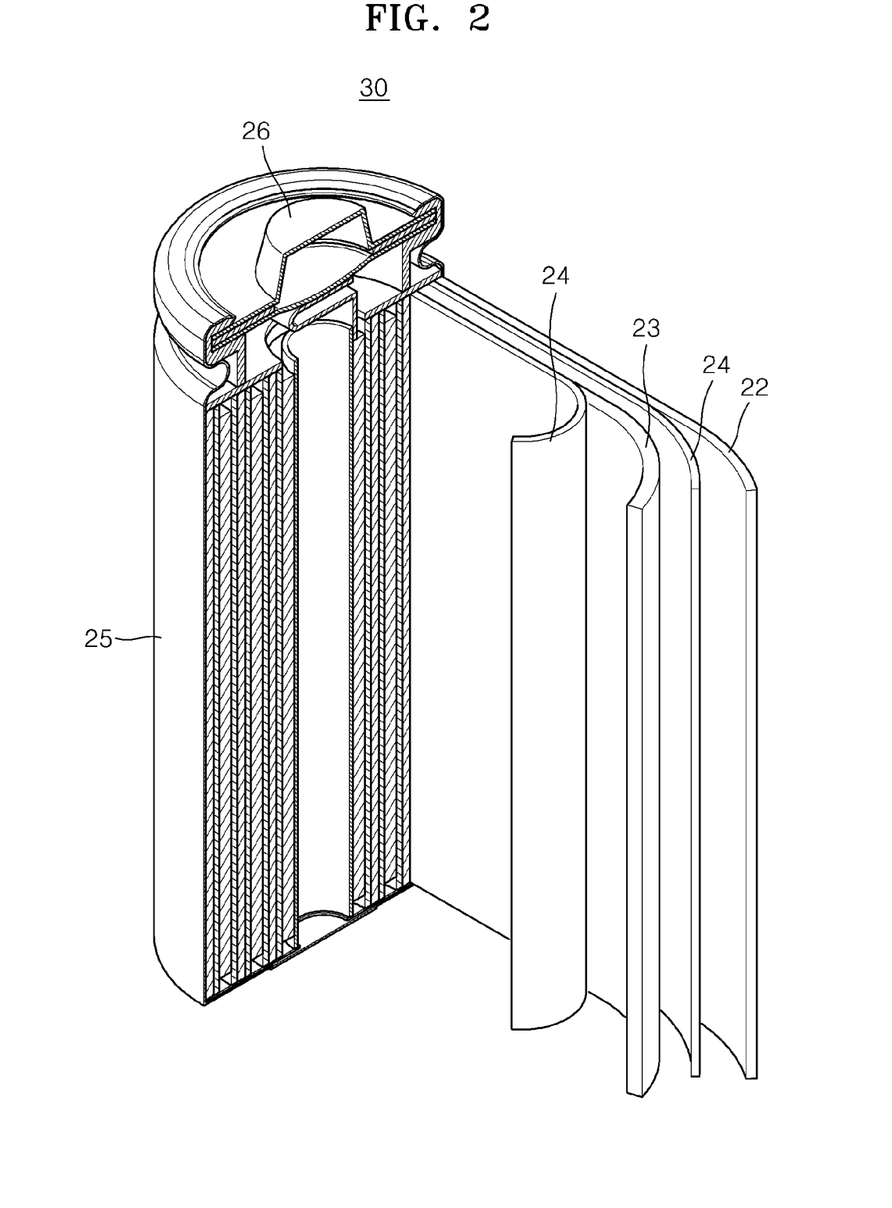
FIG. 2 is a schematic diagram illustrating a structure of a lithium battery according to an embodiment of the present invention.

FIG. 2 is a schematic diagram illustrating a structure of a lithium battery 30 according to an embodiment of the present invention.

Referring to FIG. 2, the lithium battery 30 includes a positive electrode 23, a negative electrode 22, and a separator 24 disposed between the positive electrode 23 and the negative electrode 22. The positive electrode 23, the negative electrode 22, and the separator 24 are wound or folded, and then accommodated in a battery case 25. Subsequently, an electrolyte is injected into the battery case 25 and the battery case 25 is sealed by a sealing member 26, thereby completing manufacturing of the lithium battery 30. The battery case 25 may have a cylindrical shape, a rectangular shape, or a thin-film shape. The lithium battery 30 may be a lithium ion battery.

The lithium battery may be suitable for use as power sources for electric vehicles and power tools requiring a high capacity, a high-power output, and high temperature operability, in I addition to power sources for general mobile phones and portable computers, and may be coupled to existing internal combustion engines, fuel cells, or supercapacitors to be used in hybrid vehicles. In addition, the lithium battery may be used in other applications requiring a high-power output, a high voltage, and high temperature operability.

One or more embodiments of the present invention will now be described in more detail with reference to the following examples. However, these examples are not intended to limit the scope of the one or more embodiments of the present invention.

PREPARATION EXAMPLE 1

Preparation of Si Nanoparticle Powder

Si particles were pulverized into nanoparticles by using a bead mill. 50 g of the Si nanoparticles were added to 100 g of isopropanol to prepare a Si solution, and 5.5556 g of sucrose was added to the Si solution. The resultant mixture was pulverized using Zr beads each having a diameter of 0.3 mm at a bead spinning rate of 4000 rpm for 3 hours. Sequentially, the mixture was dried in a dry oven at 120° C. for 2 hours. The dried mixture was further pulverized in a mortar and sorted using a 325 mesh to obtain Si nanoparticle powder including sucrose.

COMPARATIVE PREPARATION EXAMPLE 1

Preparation of Si Nanoparticle Powder

Si nanoparticle powder was prepared in the same manner as in Preparation Example 1, except that sucrose was not used.

COMPARATIVE PREPARATION EXAMPLE 2

Preparation of Si Nanoparticle Powder 10 wt % of a pitch was prepared by dissolving a coal tar pitch in NMP and the prepared pitch was uniformly coated on the Si nanoparticle powder prepared according to Comparative Preparation Example 1 to obtain pitch-coated Si nanoparticle powder.

EVALUATION EXAMPLE 1

Measurement of Electrical Conductivity of Si Nanoparticle Powder

Electrical conductivity according to compression density of each of the Si nanoparticle powders prepared according to Preparation Example 1 and Comparative Preparation Example 1 was measured using an electrical conductivity measuring device (MCP-PD51, available from Mitsubishi Chemical Corporation).

Holders were filled with a certain amount of each of the Si nanoparticle powder including sucrose of Preparation Example 1 and the Si nanoparticle powder of Comparative Preparation Example 1 not including sucrose, and then pressurized to prepare pellets. Each pellet had a mass of 2.040 g. A distance between positive and negative electrodes was 3 mm, each electrode had a radius of 0.7 mm, and each pellet had a radius of 10 mm. A resistance (R) of each pellet was calculated for each of different pressures by using a four-point probe method. By using a correction factor considering a thickness and a shape of each pellet and the resistance obtained as described above, a specific resistance and electrical conductivity of each pellet were calculated.

$$\rho = G \times R, \ G = 3.575 \times t;$$ Specific resistance formula:

wherein ρ denotes a specific resistance, R denotes a resistance value, G denotes a shape correction factor, and t denotes a thickness of a pellet, and $$\sigma = \frac{1}{\rho};$$

σ: electrical conductivity, ρ: specific resistance.

Figure 3:
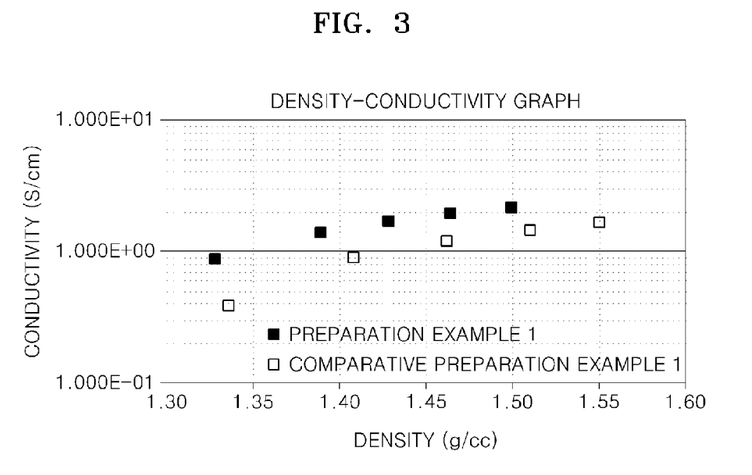
FIG. 3 is a graph showing measurement results of electrical conductivity of Si nanoparticles in a powder form prepared according to Preparation Example 1.

The Si nanoparticle powder of Comparative Preparation Example 1 had no conductivity, and thus the electrical conductivity thereof could not be measured. Thus, only the measurement results of the electric conductivity of the Si nanoparticle powder of Preparation Example 1 and the electric conductivity of the unpulverized Si particles are illustrated in FIG. 3 to compare the resistances thereof. Referring to FIG. 3, the electrical conductivity of the Si nanoparticle powder including sucrose of Preparation Example 1 is higher than that of the unpulverized Si particles, i.e., about 150% that of the unpulverized Si particles.

EXAMPLE 1

Preparation of Negative Active Material

Expandable graphite (manufactured by Samjung CNG) was expanded in a box type dry oven at 250° C. for 30 minutes and mechanically pulverized with ultrasound by using a microfluidizer to prepare a graphene sheet having a size of 5 to 10 μm. Subsequently, 20 g of the graphene sheet was mixed with 5 g of the Si nanoparticle powder of Preparation Example 1, the resultant mixture was spherized using a hybridizer (Product name: NHS, manufactured by Nara Machinery Co., Ltd.) at 14,500 rpm for 10 minutes, and the spherized product was coated with 10 wt % of a coal tar pitch. The pitch-coated spherized particles were heat treated at 800° C. in a nitrogen atmosphere to prepare a negative active material.

EXAMPLE 2

Preparation of Negative Active Material

A negative active material was prepared in the same manner as in Example 1, except that 5 g of the Si nanoparticle powder of Preparation Example 1 was used alone without using the graphene sheet.

EXAMPLE 3

Preparation of Negative Active Material

A negative active material was prepared in the same manner as in Example 1, except that the spherized product was not coated with the coal tar pitch.

EXAMPLE 4

Preparation of Negative Active Material

A negative active material was prepared in the same manner as in Example 2, except that the pitch coating process was not performed.

COMPARATIVE EXAMPLE 1

Preparation of Negative Active Material

A negative active material was prepared in the same manner as in Example 1, except that the Si nanoparticle powder prepared according to Comparative Preparation. Example 1 was used instead of the Si nanoparticle powder of Preparation Example 1.

COMPARATIVE EXAMPLE 2

Preparation of Negative Active Material

A negative active material was prepared in the same manner as in Example 2, except that the Si nanoparticle powder of Comparative Preparation Example 1 was used instead of the Si nanoparticle powder of Preparation Example 1.

EVALUATION EXAMPLE 2

Analysis of TEM and CP Image of Negative Active Material

Figure 4:
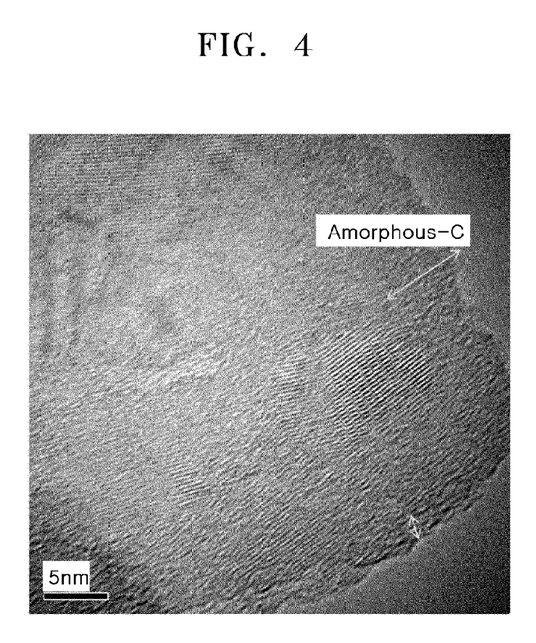
FIG. 4 is an enlarged transmission electron microscopic (TEM) image of a cross-section of a negative active material prepared according to Example 1.
Figure 5:
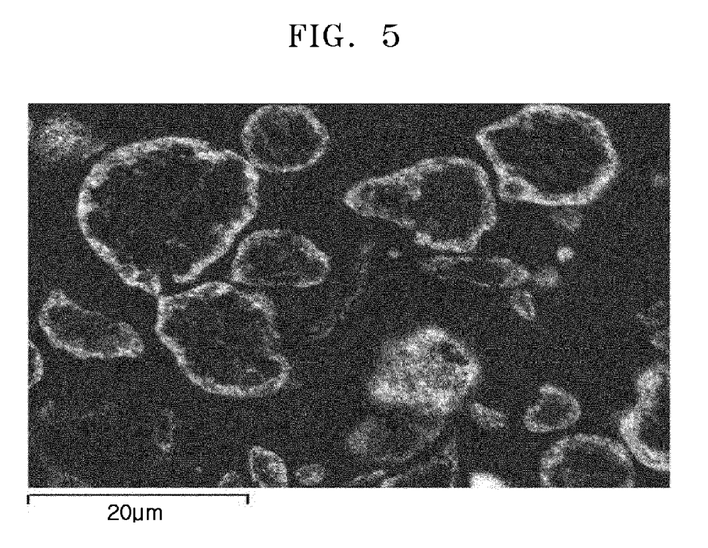
FIG. 5 is a CP image of a negative active material prepared according to Example 1.

An enlarged transmission electron microscopic (TEM) image of a cross-section of the negative active material prepared according to Example 1 is illustrated in FIG. 4 and a CP image of the negative active material prepared according to Example 1 is illustrated in FIG. 5.

As illustrated in FIG. 4, the negative active material of Example 1 included an amorphous sucrose-carbonized layer having a thickness of about 1 to about 10 nm formed on a Si nanocore. Referring to FIG. 5, it is confirmed that a pitch-coated layer is formed on a surface of a secondary particle in which primary nanoparticles having the structure described above and the graphene sheet agglomerate with each other.

EVALUATION EXAMPLE 3

X-Ray Diffraction (XRD) Analysis

Figure 6:
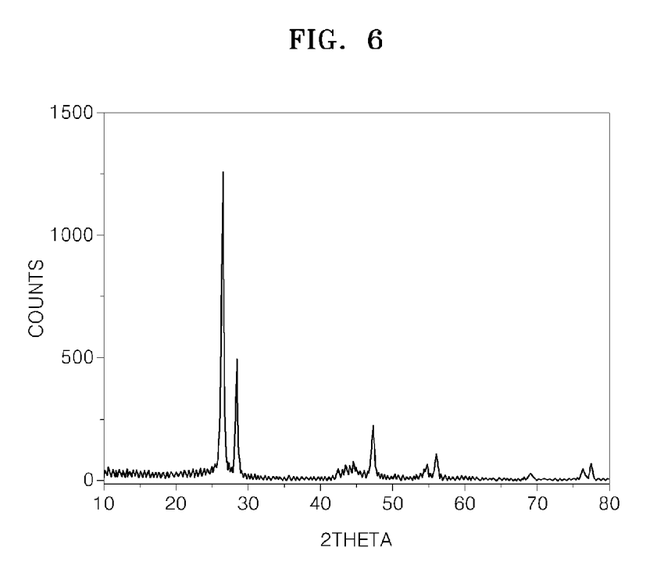
FIG. 6 is a graph showing X-ray diffraction (XRD) analysis results of a negative active material prepared according to Example 4.

XRD analysis was performed on the negative active material prepared according to Example 4, and the XRD analysis results thereof are illustrated in FIG. 6 and shown in Table 1 below. The XRD analysis was performed under conditions where a wavelength of CuK-alpha characteristic X-rays was 1.541 Å.

TABLE 1

|  | Peak(°) | FWHM(°) | T(Size-nm) |
|---|---|---|---|
| Si main | 28.3561 | 0.2362 (±0.5) | 34.69 |
| C | 44.4306 | 0.5298 (±0.5) | 16.20 |

From the XRD analysis results, it is confirmed that a peak of crystalline silicon and a peak of amorphous carbon are present.

EXAMPLES 5 THROUGH 8

Manufacture of Lithium Battery

Each of the negative active materials of Examples 1 through 4 was mixed with a mixture of 23 wt % of PAI and 97 wt % of N-methyl-2-pyrrolidone as a binder (Product name: LSR7, manufactured by Hitachi Chemical) at a weight ratio of 94:6, and, for adjustment of viscosity, N-methylpyrrolidone was added to each resultant mixture until the solid content in each mixture became 60 wt % to prepare negative active material slurries. Each negative active material slurry was then coated on a copper foil current collector having a thickness of 10 μm to fabricate negative electrode plates. Thereafter, the negative electrode plates were dried at 120° C. for 15 minutes and pressed to fabricate negative electrodes having a thickness of 60 μm. Next, each negative electrode was assembled with a Li metal as a counter electrode, a polyethylene separator having a thickness of 20 μm (Product Name: STAR20, available from Asahi), and an electrolyte to manufacture 2016R-type coin half-cells. In this regard, the electrolyte contained a mixed solvent including ethylene carbonate (EC), ethylmethyl carbonate (EMC), and diethyl carbonate (DEC) at a volume ratio of 3:3:4 and 1.10 M of $LiPF_6$.

COMPARATIVE EXAMPLES 3-4

Manufacture of Lithium Battery

A coin cell was manufactured in the same manner as in Example 5, except that each of the negative active materials prepared according to Comparative Examples 1 and 2 was used

EVALUATION EXAMPLE 4

Charge and Discharge Test (1) Evaluation of Rate Characteristics

The coin cells manufactured according to Examples 5 to 8 and Comparative Examples 3 and 4 were maintained at room temperature (25° C.) for 20 hours. Subsequently, each coin cell was subjected to one cycle of charging and discharging, wherein the charging process was performed at a charge rate of 0.2 C under a cut-off current of 0.01 C until a voltage thereof reached 0.01 V (with respect to Li) and the discharging process was performed at a discharge rate of 0.2 C under a cut-off current of 1.5 V. Thereafter, a capacity of each coin cell was measured by repetitively performing the charging and discharging processes at charge/discharge rates of 0.2 C (2 cycles), 0.5 C (3 cycles), 1 C (4 cycles), 2 C (5 cycles), 4 C (6 cycles), and 5 C (7 cycles).

To compare a capacity of a negative active material including an amorphous carbonaceous coating layer with a capacity of a negative active material that did not include a amorphous carbonaceous coating layer, initial efficiencies of the coin cells of Examples 5 and 6 and Comparative Examples 3 and 4 were measured. The results are shown in Table 2 below.

TABLE 2

|  | Charge (mAh/g) | Discharge (mAh/g) | Initial efficiency (%) |
|---|---|---|---|
| Example 5 | 1210.9 | 985.6 | 81.4 |
| Comparative Example 3 | 1214.8 | 963.8 | 79.3 |
| Example 6 | 3636.95 | 2940.25 | 80.84 |
| Comparative Example 4 | 3593.74 | 2819.35 | 78.45 |

As shown in Table 2, the initial efficiencies of the coin cells of Examples 5 and 6 including negative active materials including amorphous carbonaceous coating layers are higher than those of the coin cells of Comparative Examples 3 and 4 not including amorphous carbonaceous coating layers.

In addition, rate characteristics with respect to each cycle of the coin cells of Example 5 and Comparative Example 3 were evaluated, and the results are shown in Table 3 below.

TABLE 3

|  | Example 5 | | | Comparative Example 3 | | |
|---|---|---|---|---|---|---|
|  | Charge (mAh/g) | Discharge (mAh/g) | Efficiency (%) | Charge (mAh/g) | Discharge (mAh/g) | Efficiency (%) |
| 0.2 C | 1014.1 | 828.0 | 81.6 | 1014.3 | 744.2 | 73.4 |
| 0.2 C | 850.7 | 728.8 | 85.7 | 772.1 | 695.8 | 90.1 |
| 0.5 C | 621.2 | 550.5 | 88.6 | 556.5 | 520.5 | 93.5 |
| 1 C | 681.3 | 500.6 | 73.5 | 687.9 | 576.2 | 83.8 |
| 2 C | 503.7 | 318.0 | 63.1 | 586.5 | 291.5 | 49.7 |
| 4 C | 319.1 | 140.2 | 43.9 | 284.2 | 59.1 | 20.8 |
| 5 C | 142.4 | 107.4 | 75.4 | 61.1 | 41.2 | 67.4 |

As shown in Table 3, a capacity efficiency of the coin cell of Example 5 after one cycle of charging and discharging is higher, i.e., about 10% or greater, than that of the coin cell of Comparative Example 3 after one cycle of charging and discharging. This indicates that having sucrose carbonized at a high temperature and coated on a surface of Si nanoparticles results in an increase in the efficiency. In addition, as the charge/discharge rates go from 0.2 C to 5 C, charge/discharge capacities of the coin cell of Example 5 are higher than those of the coin cell of Comparative Example 3.

(2) Evaluation of Lifetime Characteristics

To evaluate lifetime characteristics of the coin cells of Example 5 and Comparative Example 3, the charge/discharge test performed above was conducted. While maintained at a charge/discharge rate of 5 C, 30 cycles of the charging and discharging processes were performed. The capacity of each coin cell according to cycle number was measured, and the results are illustrated in FIG. 7.

Figure 7:
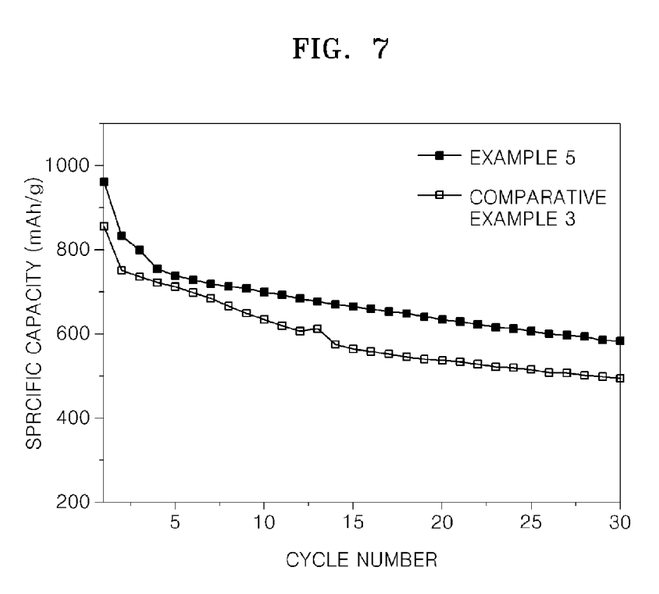
FIG. 7 is a graph showing capacity measurement results of coin cells manufactured according to Example 5 and Comparative Example 3, according to cycle number.
Figure 8:
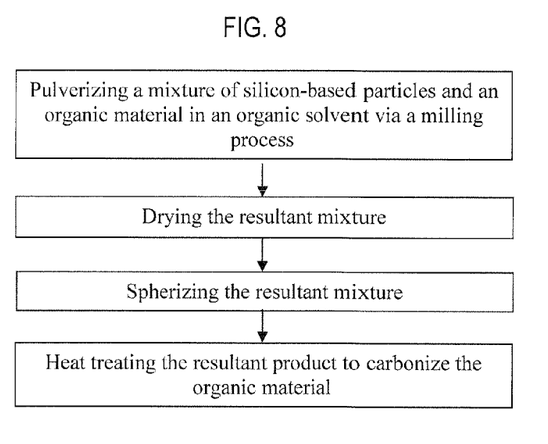
FIG. 8 is a flowchart showing a method of preparing a negative active material of the invention according to one embodiment.

As illustrated in FIG. 7, an initial capacity of the coin cell of Example 5 was 963 mAh/g, while an initial capacity of the coin cell of Comparative Example 3 was 856 mAh/g. Capacity retention rates of the coin cells of Example 5 and Comparative Example 3 when the coin cells were subjected to 30 cycles of the charging and discharging processes were 60% and 56%, respectively. From the results, it is confirmed that the coin cell of Example 5 including a sucrose-carbonized coating layer exhibits a higher capacity retention rate and a longer lifetime than the coin cell of Comparative Example 3.

As described above, according to the one or more of the above embodiments of the present invention, the negative active material may compensate irreversible capacity losses due to volumetric expansion/contraction caused when a lithium battery is charged and discharged and exhibit enhanced lifetime characteristics.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A negative active material, comprising:
a secondary particle comprising agglomerated primary nanoparticles, wherein the primary nanoparticles comprise:
a silicon-based nanocore; and
a first amorphous carbonaceous coating layer that is a continuous layer and is disposed on a surface of the silicon-based nanocore, wherein the secondary particle further comprises a crystalline carbonaceous material mixed with the primary nanoparticles within the secondary particle, wherein the secondary particle further comprises pores therein, the pores being arranged between the primary nanoparticles.

2. The negative active material of claim 1, wherein the primary nanoparticles have an average diameter in a range of about 100 to about 300 nm.

3. The negative active material of claim 1, wherein the silicon-based nanocore comprises one selected from the group consisting of Si, $SiO_x$ where $0<x \leq 2$, and a Si—Z alloy, wherein Z is an alkali metal, an alkali earth metal, a Group XIII element, a Group XIV element, a transition metal, a rare earth element, or a combination thereof, wherein Z is not Si.

4. The negative active material of claim 1, wherein the first amorphous carbonaceous coating layer comprises a carbide of an organic material selected from the group consisting of sucrose, glucose, galactose, fructose, lactose, starch, mannose, ribose, aldohexose, ketohexose, and combinations thereof.

5. The negative active material of claim 1, wherein an amount of the first amorphous carbonaceous coating layer is in a range of about 1 to about 10 parts by weight based on 100 parts by weight of the silicon-based nanocore.

6. The negative active material of claim 1, wherein a thickness of the first amorphous carbonaceous coating layer is in a range of about 1 nm to about 100 nm.

7. The negative active material of claim 1, wherein the crystalline carbonaceous material comprises a carbonaceous material having a crystalline flake structure.

8. The negative active material of claim 1, wherein the crystalline carbonaceous material comprises one selected from the group consisting of a polycyclic nano-sheet, a lamination of polycyclic nano-sheets, and a combination thereof.

9. The negative active material of claim 1, wherein the secondary particle further comprises, on a surface thereof, a secondary carbonaceous coating layer comprising a material selected from the group consisting of soft carbon, hard carbon, a meso-phase pitch carbide, sintered coke, and combinations thereof.

10. The negative active material of claim 1, wherein the secondary particles have an average diameter in a range of about 5 μm to about 30 μm.

11. A lithium battery comprising:
a negative electrode comprising the negative active material according to claim 1;
a positive electrode comprising a positive active material and facing the negative electrode; and
an electrolyte interposed between the negative electrode and the positive electrode.

12. The negative active material of claim 1, wherein an amount of the first amorphous carbonaceous coating layer is in a range of about 4 to about 6 parts by weight based on 100 parts by weight of the silicon-based nanocore.

13. The negative active material of claim 1, the negative active material being absent of any conductive material selected from a group consisting of natural graphite, artificial graphite, carbon blacks, acetylene black, Ketjen black, and carbon fibers; metallic powders such as copper powder, nickel powder, aluminum powder, and silver powder; conductive polymers such as polyphenylene derivatives and mixtures thereof.

14. A negative active material comprising a secondary particle comprising agglomerated primary nanoparticles, wherein each of the primary nanoparticles comprise:
a silicon-based nanocore, wherein the silicon-based nanocore comprises one selected from the group consisting of Si, $SiO_x$ where $0<x \leq 2$, and a Si—Z alloy, wherein Z is an alkali metal, an alkali earth metal, a Group XIII element, a Group XIV element, a transition metal, a rare earth element, or a combination thereof, wherein Z is not Si; and
a first amorphous carbonaceous coating layer that is a continuous layer and is disposed on a surface of the silicon-based nanocore, wherein the first amorphous carbonaceous coating layer comprises a carbide produced by carbonizing an organic material selected from a group consisting of sucrose, glucose, galactose, fructose, lactose, starch, mannose, ribose, aldohexose, ketohexose, and combinations thereof,
wherein the secondary particle further comprises a crystalline carbonaceous material, wherein the crystalline carbonaceous material comprises a carbonaceous material having a crystalline flake structure, wherein the crystalline carbonaceous material comprises one selected from the group consisting of a polycyclic nano-sheet, a lamination of polycyclic nano-sheets and combinations thereof, wherein the secondary particle further comprises, on a surface thereof, a secondary carbonaceous coating layer comprising a material selected from the group consisting of soft carbon, hard carbon, a meso-phase pitch carbide, sintered coke, and combinations thereof, wherein the secondary particle further comprises pores therein, the pores being arranged between the primary nanoparticles.

15. The negative active material of claim 14, wherein the primary nanoparticles have an average diameter in a range of about 100 to about 300 nm, wherein an amount of the first amorphous carbonaceous coating layer is in a range of about 4 to about 6 parts by weight based on 100 parts by weight of the silicon-based nanocore, wherein a thickness of the first amorphous carbonaceous coating layer is in a range of about 1 nm to about 100 nm, wherein the secondary particles have an average diameter in a range of about 10 μm to about 20 μm.

16. The negative active material of claim 1, wherein an amount of the crystalline carbonaceous material is in the range of about 75 to about 95 parts by weight based on 100 parts by weight of the primary nanoparticles.

17. The negative active material of claim 14, wherein an amount of the crystalline carbonaceous material is in the range of about 75 to about 95 parts by weight based on 100 parts by weight of the primary nanoparticles.

18. The negative active material of claim 1, wherein the first amorphous carbonaceous coating layer is produced by subjecting an organic material coated on the silicon based nanocore to a heat treatment process at a temperature in a range of about 700 to about 1000° C.

19. The negative active material of claim 14, wherein the primary nanoparticles have an average diameter in a range of about 100 to about 300 nm.

* * * * *